(12) United States Patent
Youngblood et al.

(10) Patent No.: US 11,028,019 B2
(45) Date of Patent: Jun. 8, 2021

(54) BORON CARBIDE COMPOSITE

(71) Applicant: Purdue Research Foundation, West Lafayette, IN (US)

(72) Inventors: Jeffrey P Youngblood, West Lafayette, IN (US); Erich Weaver, West Lafayette, IN (US); Rodney W. Trice, West Lafayette, IN (US); Andres Diaz-Cano, West Lafayette, IN (US); Andrew Schlup, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 83 days.

(21) Appl. No.: 16/655,325

(22) Filed: Oct. 17, 2019

(65) Prior Publication Data

US 2020/0172441 A1 Jun. 4, 2020

Related U.S. Application Data

(60) Provisional application No. 62/772,659, filed on Nov. 29, 2018.

(51) Int. Cl.
*C04B 35/563* (2006.01)
*C04B 35/64* (2006.01)
*C04B 35/626* (2006.01)
*B28B 1/24* (2006.01)
*B28B 11/24* (2006.01)

(52) U.S. Cl.
CPC .............. *C04B 35/563* (2013.01); *B28B 1/24* (2013.01); *B28B 11/243* (2013.01); *C04B 35/6261* (2013.01); *C04B 35/6264* (2013.01); *C04B 35/64* (2013.01); *C04B 2235/3225* (2013.01); *C04B 2235/3821* (2013.01); *C04B 2235/3847* (2013.01); *C04B 2235/6022* (2013.01); *C04B 2235/656* (2013.01); *C04B 2235/668* (2013.01)

(58) Field of Classification Search
CPC .................................................... C04B 35/563
See application file for complete search history.

(56) References Cited

U.S. PATENT DOCUMENTS

| 4,097,293 | A | 6/1978 | Komeya et al. |
| 7,309,672 | B2 | 12/2007 | Mikijelj et al. |
| 2007/0203012 | A1* | 8/2007 | Oda ...................... C04B 35/563 501/87 |

FOREIGN PATENT DOCUMENTS

CN 102757224 A * 10/2012

OTHER PUBLICATIONS

Yin et al "Microstructure, Mechanical and thermal properties of in situ toughened boron carbide based ceramic composites co-doped with tungsten carbide and pyrolytic carbon" Journal of European Ceranic Society 33 (2013) 1647-1654 (Year: 2013).*
Kumazawa T., et al., Pressureless Sintering of Boron Carbide Ceramics. Journal of the Ceramic Society of Japan. 116 [12], 1319-1321, 2008.

* cited by examiner

*Primary Examiner* — Karl E Group
(74) *Attorney, Agent, or Firm* — Purdue Research Foundation; Zhigang Rao

(57) ABSTRACT

The present disclosure relates to boron carbide (B$_4$C) composite material and the method of making and using the boron carbide (B$_4$C) composite.

7 Claims, No Drawings

BORON CARBIDE COMPOSITE

CROSS-REFERENCE TO RELATED APPLICATION

This application claims the benefits of U.S. Provisional Application Ser. No. 62/772,659, filed Nov. 29, 2018, the contents of which are incorporated herein entirely

GOVERNMENT RIGHTS

This invention was made with government support under N00014-17-1-2155 awarded by the Office of Naval Research (ONR) and W911NF-13-1-0425 awarded by the Army Research Office (ARO). The United States government has certain rights in the invention.

TECHNICAL FIELD

The present disclosure relates to novel boron carbide ($B_4C$) composite material and the method of making and using the novel boron carbide ($B_4C$) composite.

BACKGROUND

This section introduces aspects that may help facilitate a better understanding of the disclosure. Accordingly, these statements are to be read in this light and are not to be understood as admissions about what is or is not prior art.

Boron carbide is useful for applications where ultra-hard components are needed, such as wear-resistant bearings, sand-blasting nozzles, abrasives and ballistic armor. There are significant challenges, such as the high temperatures required and particle coarsening, associated with the pressureless sintering of boron carbide ($B_4C$). The strong, stable covalent bonds of $B_4C$ give it notoriously low sintering ability and sintering mechanisms that lead to densification, such as bulk diffusion and grain boundary diffusion, only become effective at temperatures in excess of 2300° C. One important consideration for achieving near theoretical density $B_4C$ components using pressureless sintering is the use of sintering aids. Sintering aids have been widely shown to improve the densification of $B_4C$ at lower temperatures than would be required for non-doped systems. It has also been shown that the addition of sintering aids may be beneficial to both hardness and fracture toughness. See U.S. Pat. No. 7,309,672B2.

While methods/composites in previous disclosures provided some improvements, better boron carbide composite materials and methods of preparing such materials are still needed.

SUMMARY

The present invention provides novel boron carbide ($B_4C$) composite material and the method of making and using the novel boron carbide ($B_4C$) composite.

In one embodiment, the present disclosure provides a novel composite material comprising a sintered product of a mixture comprising 70-95 wt. % of boron carbide ($B_4C$), 2-15 wt. % of tungsten carbide (WC), and 3-15 wt. % of yttrium oxide ($Y_2O_3$), wherein said boron carbide, tungsten carbide, and yttrium oxide are substantially uniformly distributed in the sintered product.

In one embodiment, the present disclosure provides a method of preparing the novel boron carbide ($B_4C$) composite material of the present disclosure, wherein the method comprises:

attrition milling boron carbide and tungsten carbide in ethanol to provide an attrition milled powder comprising boron carbide and tungsten carbide, wherein said boron carbide after the attrition milling is substantially free of boron oxide ($B_2O_3$);

preparing an aqueous suspension comprising the attrition milled boron carbide and tungsten carbide powder, and yttrium oxide powder;

injecting mold said suspension and making it a dried mixture; and sintering the dried mixture at a temperature range of 1600-2600° C.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure the term "about" can allow for a degree of variability in a value or range, for example, within 10%, within 5%, or within 1% of a stated value or of a stated limit of a range.

In the present disclosure the term "substantially" can allow for a degree of variability in a value or range, for example, within 90%, within 95%, or within 99% of a stated value or of a stated limit of a range.

In the present disclosure the term "relative density" refers to a comparison between the bulk density of a material (i.e. the density measured using the Archimedes' technique which includes voids and other defects) compared to the theoretical density of the material (i.e. the density if there were no voids or defects). It is usually expressed as a percentage.

In one embodiment, the present disclosure provides a novel composite material comprising a sintered product of a mixture comprising 70-95 wt. % of boron carbide ($B_4C$), 2-15 wt. % of tungsten carbide (WC), and 3-15 wt. % of yttrium oxide ($Y_2O_3$), wherein said boron carbide, tungsten carbide, and yttrium oxide are substantially uniformly distributed in the sintered product.

In one embodiment, the present disclosure provides a novel composite material comprising a sintered product of a mixture comprising 70-90 wt. % of boron carbide ($B_4C$), 5-15 wt. % of tungsten carbide (WC), and 5-15 wt. % of yttrium oxide ($Y_2O_3$), wherein said boron carbide, tungsten carbide, and yttrium oxide are substantially uniformly distributed in the sintered product.

In one embodiment, the present disclosure provides a novel composite material comprising a sintered product of a mixture comprising boron carbide ($B_4C$), tungsten carbide (WC), and yttrium oxide ($Y_2O_3$), wherein the sintered product has a relative density of 90-99%.

In one embodiment, the present disclosure provides a novel composite material comprising a sintered product of a mixture comprising boron carbide ($B_4C$), tungsten carbide (WC), and yttrium oxide ($Y_2O_3$), wherein the sintered product is obtained under substantially pressureless condition at a temperature range of 1600-2600° C.

In one embodiment, the present disclosure provides a novel composite material comprising a sintered product of a mixture comprising boron carbide ($B_4C$), tungsten carbide (WC), and yttrium oxide ($Y_2O_3$), wherein said boron carbide is first attrition milled with tungsten carbide in ethanol to provide attrition milled mixture of boron carbide and tungsten carbide, wherein said boron carbide after attrition milled is substantially free of boron oxide ($B_2O_3$).

In one embodiment, the present disclosure provides a method of preparing the novel boron carbide ($B_4C$) composite material of the present disclosure, wherein the method comprises:

attrition milling boron carbide and tungsten carbide in ethanol to provide an attrition milled powder comprising boron carbide and tungsten carbide, wherein said boron carbide after the attrition milling is substantially free of boron oxide ($B_2O_3$);

preparing an aqueous suspension comprising the attrition milled boron carbide and tungsten carbide powder, and yttrium oxide powder;

injecting mold said suspension and making it a dried mixture; and sintering the dried mixture at a temperature range of 1600-2600° C.

In one embodiment, the present disclosure provides a method of preparing the novel boron carbide ($B_4C$) composite material of the present disclosure, wherein the sintering is carried out at substantially pressureless condition.

Experimental Sections

Boron carbide ($B_4C$) powder (H. C. Starck, Germany) with an average particle size of 1.1 micron was used as a starting powder, which had a chemical composition as provided in Table 1:

TABLE 1

Chemical composition of the as-received boron carbide.

| Element | Wt. % |
| --- | --- |
| B | 75.8 |
| C | 22.3 |
| N | 0.5 |
| O | 1.3 |
| Fe | 0.02 |
| Si | 0.06 |
| Al | <0.01 |

Three different powder treatments were performed. The first was as-received powder with no treatment.

The second kind of treatment was that the as-received boron carbide was treated by washing in ethanol.

The third was attrition milling in ethanol with sintering aids. In the process utilized in the present disclosure, $B_4C$ powder is first attrition milled in ethanol to remove the thin layer of $B_2O_3$ that forms on the surface of $B_4C$ particles. Due to the extreme hardness of $B_4C$, the WC—Co milling media is slowly eroded and mixed into the $B_4C$ powder during attrition milling. As a result, the attrition milled powder is about 2-15% by weight WC—Co. The using of attrition milling increases final densities when compared to using as-received or ethanol washed powders. However, it was noticed the relative density is still below 85% with only WC addition (Table 2).

$B_4C$ powder was suspended in ethanol and attrition milled with ⅛" 94% tungsten carbide-6% cobalt (WC—Co) milling media for 2 hours at 50 rpm. The milling media to powder ratio was 6.7:1. The powders were dried overnight and then ball milled for 24 hours. During attrition milling, an amount of the WC—Co milling media was worn away and integrated into the $B_4C$ powder. This amount ranged from 2-10 wt. % depending on the batch. Ethanol washed powder was treated in a manner identical to attrition milling, except no WC—Co milling media was added. Tungsten carbide (WC) powder with an average particle size of 0.75 micron was added to the as-received and ethanol washed powders. Powder mixtures with the compositions provided in Table 2 were prepared, with variation of the quantity of sintering aids from 0-20 wt. %.

TABLE 2

| Samples 1-9 | | | | |
| --- | --- | --- | --- | --- |
| Sample No. | Powder Preparation | $B_4C$ (wt. %) | WC—Co (wt. %) | WC (wt. %) | Relative Density (%) |
| 1 | As-received | 100 | NA | NA | 76.63 |
| 2 | As-received | 90 | NA | 10 | 77.85 |
| 3 | As-received | 85 | NA | 15 | 78.83 |
| 4 | As-received | 80 | NA | 20 | 78.79 |
| 5 | Ethanol washed | 100 | NA | NA | 78.23 |
| 6 | Ethanol washed | 90 | NA | 10 | 79.03 |
| 7 | Ethanol washed | 85 | NA | 15 | 79.86 |
| 8 | Ethanol washed | 80 | NA | 20 | 79.92 |
| 9 | Attrition milled | 85 | 15 | NA | 81.13 |

Pellets of each composition were uniaxially pressed at 34.5 MPa for 20 seconds in a steel die with a diameter of 15 mm. Pellets were placed in a graphite crucible and sintered in a flowing argon atmosphere for 1 hour at 2000° C. with a ramp rate of 25° C./min. After cooling, the pellets were removed and cleaned. Density was measured using Archimedes' method (ASTM C373-14a).

The data of samples 1-9 in Table 2 showed that the addition of WC is beneficial to the pressureless sintering of $B_4C$. Ethanol washing is also beneficial, as the layer of boric oxide ($B_2O_3$) found on the surface of $B_4C$ particles dissolves in ethanol. Attrition milling has a significant benefit over ethanol washing, even when WC is intentionally added to match the WC—Co concentration from attrition milling.

Samples 10-31 were prepared in a manner similar to examples 1-9 except yttrium oxide ($Y_2O_3$) powder with a specific surface area of 6.49 m²/g was also used as a sintering aid. Powder mixtures with the compositions provided in Table 3 were prepared. Powders were mixed in a planetary mixer (Flacktek, South Carolina) at 800 rpm to ensure even mixing.

Sample 32 was prepared by first mixing a highly loaded (>50 vol. %) aqueous suspension using the attrition milled $B_4C$/WC—Co powder, $Y_2O_3$ powder, concentrated 12M HCl, and small amount of branched polyethylenimine (PEI, $M_w$=25,000 g/mol) for improved green body strength. The suspension is then injection molded at room temperature. Afterwards, the component is allowed to dry before undergoing binder burnout and sintering. The final composition of the sintered components is 70-95% $B_4C$, 2-15% WC—Co, and 3-15% $Y_2O_3$ by weight. The addition of $Y_2O_3$ significantly increases the final density of $B_4C$ over a wide variety of compositions and outperforms traditional $B_4C$ sintering aids over much of that range (Table 3). Sample 33-35 are made essentially the same as Sample 32.

TABLE 3

Samples 10-35

| Sample No. | Powder Preparation | B$_4$C (wt. %) | WC—Co (wt. %) | Y$_2$O$_3$ (wt. %) | WC (%) | Sintering aids total (wt. %) | Relative density (%) |
|---|---|---|---|---|---|---|---|
| 10 | As-received | 90 | | 10 | | 10 | 86.65 |
| 11 | As-received | 87.5 | | 10 | 2.5 | 12.5 | 86.94 |
| 12 | As-received | 85 | | 10 | 5 | 15 | 86.96 |
| 13 | As-received | 82.5 | | 10 | 7.5 | 17.5 | 88.18 |
| 14 | As-received | 80 | | 10 | 10 | 20 | 88.18 |
| 15 | As-received | 77.5 | | 10 | 12.5 | 22.5 | 89.3 |
| 16 | As-received | 75 | | 10 | 15 | 25 | 89.51 |
| 17 | Ethanol washed | 90 | | 10 | | 10 | 87.27 |
| 18 | Ethanol washed | 87.5 | | 10 | 2.5 | 12.5 | 87.1 |
| 19 | Ethanol washed | 85 | | 10 | 5 | 15 | 87.58 |
| 20 | Ethanol washed | 82.5 | | 10 | 7.5 | 17.5 | 89.24 |
| 21 | Ethanol washed | 80 | | 10 | 10 | 20 | 88.37 |
| 22 | Ethanol washed | 77.5 | | 10 | 12.5 | 22.5 | 89.1 |
| 23 | Ethanol washed | 75 | | 10 | | 25 | 89.92 |
| 24 | Attrition milled | 85 | 5 | 10 | | 15 | 87.73 |
| 25 | Attrition milled | 82.5 | 7.5 | 10 | | 17.5 | 88.71 |
| 26 | Attrition milled | 80 | 5.08 | 10 | 4.92 | 20 | 89.49 |
| 27 | Attrition milled | 77.5 | 5.08 | 10 | 7.67 | 22.5 | 89.48 |
| 28 | Attrition milled | 75 | 5.08 | 10 | 9.92 | 25 | 91.17 |
| 29 | Attrition milled | 90 | 5 | 5 | | 10 | 86.45 |
| 30 | Attrition milled | 85 | 5 | 10 | | 15 | 90.98 |
| 31 | Attrition milled | 80 | 5 | 15 | | 20 | 93.81 |
| 32 | Attrition milled | 84 | 6 | 10 | | 16 | 97.28 |
| 33 | Attrition milled | 82.79 | 7.21 | 10 | | 17.21 | 97.67 |
| 34 | Attrition milled | 90.34 | 4.66 | 5 | | 9.66 | 94.06 |
| 35 | Attrition milled | 78.59 | 5.91 | 15 | | 21.41 | 95.43 |

The data of samples 10-35 in Table 3 showed that Y$_2$O$_3$ has a strong beneficial effect on densification of B$_4$C over a wide variety of compositions, regardless of powder treatment. In addition, adding 10 wt. % Y$_2$O$_3$ increases the effect of WC additions. This suggests that there is a synergic benefit to using both sintering aids simultaneously.

To compare the performance of the composites of the present disclosure and the performance of the composites of U.S. Pat. No. 7,309,672B2, a comparison study was carried out. The results can be found in Table 4.

TABLE 4

Samples 36*-37*

| Sample No. | Powder Preparation | B$_4$C (wt. %) | Al$_2$O$_3$ (wt. %) | Y$_2$O$_3$ (wt. %) | Sintering aids total (wt. %) | Relative density (%) |
|---|---|---|---|---|---|---|
| 36* | As-received | 95 | 3 | 2 | 5 | 85.22 |
| 37* | As-received | 98 | 1.2 | 0.8 | 2.0 | 83.12 |

Samples 36* and 37* are made corresponding to the method of preparing the Examples 5 and 7 in the U.S. Pat. No. 7,309,672B2. It is clear that composites of the present disclosure provided higher relative density. For example, sample 32 had over 97% relative density, which is more than 10% improvement.

Pellets of each composition was uniaxially pressed at 34.5 MPa for 20 seconds in a steel die with a diameter of 15 mm. Pellets were placed in a graphite crucible and sintered in a flowing argon atmosphere for 1 hour at 2000° C. with a ramp rate of 25° C./min. After cooling, the pellets were removed and cleaned. Density was measured using Archimedes' method (ASTM C373-14a).

Those skilled in the art will recognize that numerous modifications can be made to the specific implementations described above. The implementations should not be limited to the particular limitations described. Other implementations may be possible.

We claim:

1. A composite material comprising a sintered product of a mixture comprising 70-95 wt. % of boron carbide (B$_4$C), 2-15 wt. % of tungsten carbide-cobalt (WC—Co), and 3-15 wt. % of yttrium oxide ($Y_2O_3$), wherein said boron carbide, tungsten carbide-cobalt (WC—Co), and yttrium oxide are substantially uniformly distributed in the sintered product, wherein the sintered product has a relative density of 90-99%.

2. The composite material of claim 1, wherein the mixture comprises 70-90 wt. % of boron carbide ($B_4C$), 5-15 wt. % of tungsten carbide-cobalt (WC—Co), and 5-15 wt. % of yttrium oxide ($Y_2O_3$).

3. The composite material of claim 1, wherein the sintered product has a relative density of 97-99%.

4. The composite material of claim 1, wherein the sintered product is obtained under substantially pressureless condition at a temperature range of 1600-2600° C.

5. The composite material of claim 1, wherein said boron carbide is first attrition milled with tungsten carbide in ethanol to provide attrition milled mixture of boron carbide and tungsten carbide-cobalt (WC—Co), wherein said boron carbide after attrition milled is substantially free of boron oxide ($B_2O_3$).

6. A method of preparing the composite material of claim 1, comprising:

attrition milling boron carbide and tungsten carbide in ethanol to provide an attrition milled powder comprising boron carbide and tungsten carbide-cobalt (WC—Co), wherein said boron carbide after the attrition milling is substantially free of boron oxide ($B_2O_3$);

preparing an aqueous suspension comprising the attrition milled boron carbide and tungsten carbide-cobalt (WC—Co) powder, and yttrium oxide powder;

injecting mold said suspension and making it a dried mixture; and sintering the dried mixture at a temperature range of 1600-2600° C. to provide the composite material.

7. The method of claim 6, wherein the sintering is carried out at substantially pressureless condition.

* * * * *